United States Patent [19]

Boostrom

[11] Patent Number: 4,798,464
[45] Date of Patent: Jan. 17, 1989

[54] SCANNING ARRAY SPECTROPHOTOMETER

[75] Inventor: Roy E. Boostrom, Elmhurst, Ill.

[73] Assignee: The Perkin-Elmer Corporation, Norwalk, Conn.

[21] Appl. No.: 838,858

[22] Filed: Mar. 12, 1986

Related U.S. Application Data

[63] Continuation-in-part of Ser. No. 704,356, Feb. 21, 1985, Pat. No. 4,692,883.

[51] Int. Cl.⁴ .......................... G01J 3/08; G01J 3/10; G01J 3/36
[52] U.S. Cl. ..................................... 356/328; 356/334
[58] Field of Search ...................... 356/326, 328, 334; 364/526, 571

[56] References Cited

U.S. PATENT DOCUMENTS

| 4,330,210 | 5/1982 | Hashimoto et al. | 356/328 |
| 4,563,090 | 1/1986 | Witte | 356/328 |
| 4,613,233 | 9/1986 | Wilson | 356/334 X |
| 4,692,883 | 9/1987 | Nelson et al. | 356/328 X |

FOREIGN PATENT DOCUMENTS

| 56-157822 | 12/1981 | Japan | 356/328 |
| 57-111422 | 7/1982 | Japan | 356/334 |
| 57-128823 | 8/1982 | Japan | 356/328 |

OTHER PUBLICATIONS

Malone et al "An Interactive Microprocessor-Controlled Spectrophotometer" Am. Lab (USA), Jun. 1980 vol. 12 #6, pp. 76-81.

Primary Examiner—Vincent P. McGraw
Attorney, Agent, or Firm—Edwin T. Grimes; Francis L. Masselle; Ronald G. Cummings

[57] ABSTRACT

The advantage of sustained wavelength accuracy and mechanical simplicity of a spectrophotometer using a photodiode array as photometric detector and a fixed diffraction grating as dispersion means may be limited to a relatively short wavelength range by problems of stray light, second order errors and overloading of the detector at portions of the wavelength range. By utilizing repeat scanning of the array, each scan being modified by using a different source lamp and correction filters, freedom from the cited problems over part of each scanned wavelength range can be effected. A computer controls the scan sequence and combines the usable portion of each scan to produce error free operation over an extended range.

34 Claims, 1 Drawing Sheet

SCANNING ARRAY SPECTROPHOTOMETER

FIELD OF INVENTION

This invention relates to spectrophotometry and, more specifically, to a means for increasing the usable wavelength range, reduction of stray light and increase of accuracy and operational speed of a low cost spectrophotometer using a photodiode array as the photometric device.

This application is a continuation-in-part of U.S. patent application Ser. No. 704,356 filed Feb. 21, 1985, now U.S. Pat. No. 4,692,883. The disclosure therein is incorporated by reference. The two applications are assigned to the same Assignee.

BACKGROUND OF THE INVENTION

The simplest form of array spectrophotometer utilizes a single fixed diffraction grating dispersing a spectrum over the length of a photodiode array (PDA) located in the exit focal plane. However, unless only a short wavelength range is covered such a system suffers from excessive stray light errors as well as second order errors, particularly if more than one source is used, eg. a tungsten lamp for the visible range and a deuterium arc lamp for the UV range. Prior art systems try to eliminate such errors by using order sorting or energy correction filters inserted sequentially into the source beam. This, however, requires a complex of expensive multiple filters and moving parts which act at slow speeds and produce spikes and offsets at transition points on the scan data.

This invention discloses a combination of simple optical means associated with a novel computer control routine which overcomes the defects cited above for prior art systems.

It is an object of this invention to provide an improved array spectrophotometer using a single fixed diffraction grating as dispersive means.

It is a further object to provide more than one energy source, each of these sources providing radiation over an effective part of the total wavelength range; the sum of these parts covering the total range.

It is a further object to scan the wavelength range more than once using a different source during each scan, and subsequently by computer means to combine the data thus obtained to give complete range coverage.

It is an objective of the computer data processing to correct for stray light associated with each source over the effective range of said source.

It is a further objective to switch said sources optically by simple computer controlled means without extinguishing said sources.

It is also an objective to utilize a fixed optical filter to provide rejection of second order reference stray light in effective combination with said computer controlled switching means.

It is yet a further objective to provide computer controlled spectral response flattening means for said sources as required to avoid response overload of the photocell array.

It is also an objective to provide computer combination of selected ranges of each scan appropriate to each source, and rejection of the rest of each scan so that only the effective range of each source appears in the final data.

It is also a further objective to smooth the data by computer means at the transition from one source to another so that no transition spikes, offsets or other artifacts will appear in the combined scan.

BRIEF DESCRIPTION OF THE INVENTION

The spectrophotometer of the preferred embodiment of the invention comprises deuterium and tungsten light sources; suitable optical filters for adjusting optical beam intensity level, minimizing stray light and for order sorters; sample holder means; and a monochromator associated with a photodiode array (PDA) which serves as the monochromator exit slit. In effect, the PDA comprises a multiplicity of narrow, rectangular photocell elements, side by side, each receiving a narrow band of wavelengths from the dispersed monochromator spectrum. Thus, the PDA delivers a sequentially scanned series of discrete signals each corresponding to the spectral output of a particular segment of the spectrum. In the preferred embodiment herein set forth, the dispersion means of the monochromator comprises a fixed diffraction grating. The PDA receives the whole wavelength range of the instrument, e.g. 200 to 850 nanometers (nm) simultaneously, being electronically scanned to output a spectral response curve covering that range for display after processing.

Although the PDA scan covers the whole wavelength range of the instrument, selection of a particular part of this range can be effected digitally or through operator command. Since the grating is fixed, wavelength errors due to moving parts are eliminated. The invention involves automatic computer controlled shutters and energy leveling filter means to correct for stray light and second order errors. These computer controls implement the novel concept of scanning the whole PDA range for each source successively with the proper filter sequence placed in the optical beam for each source, processing the data obtained to retain and utilize only that useful part of the data free from objectionable error originating rom that source for each scan, and then combining serially by wavelength only the useful segment of each scan retained to obtain a single complete scan covering the whole wavelength range. This makes possible accurate and reliable use of the PDA over a wide wavelength range in a precision high speed scanning spectrophotometer.

The PDA used in this instrument, which may for example be a Reticon RL512S, receives the spectrum on 512 parallel photosensitive bars or photodiodes, each bar or pixel being 2.5 mm long and spaced 25 μm from adjacent pixels. The small pixel width makes extreme precision necessary in proper placement of the spectrum for wavelength readout accuracy. This placement can be affected by mechanical variations in the monochromator, temperature induced distortion of mechanical members, etc. The invention provides rapid, automatic digital correction of spectrum placement whenever required. The reference means used is to locate the deuterium emission line at 656.1 nm, available from the ultraviolet light source, on a known pixel of the PDA, thus indexing the position of the wavelength scale.

A description of how this is accomplished by digital computer means will be given later in this disclosure.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the defining of other assemblies and routines for carrying out the various purposes of the invention. It is important, therefore, that this disclosure be regarded as including such equivalent assemblies and routines as do not depart from the spirit and scope of the invention.

One embodiment of the invention has been chosen for purposes of illustration and description, and is shown in the accompanying drawing forming a part of the specification.

DETAILED DESCRIPTION OF A PRESENTLY PREFERRED EMBODIMENT OF THE INVENTION

Figure 1:
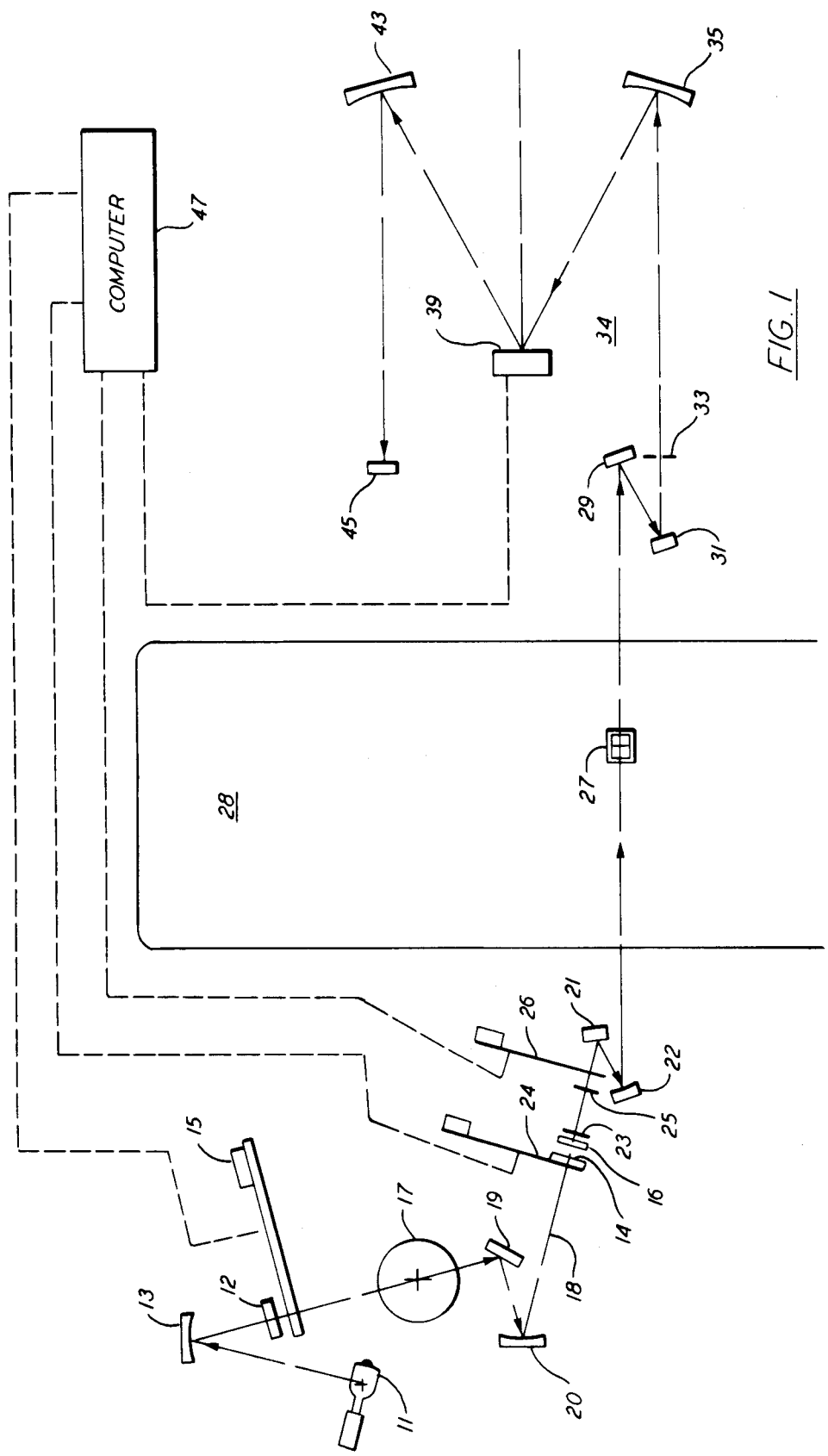
FIG. 1 shows a simplified schematic view of the optical system of the preferred embodiment.

Referring to FIG. 1 a prefocussed tungsten halide lamp 11 provides visible and near infrared (IR) radiation, which is concentrated by condenser mirror 13 on an aperture through the anode of a deuterium arc lamp 17. A fixed heat IR absorbing filter 12, typically HA50 made by Hoya, 2 mm thick, may be interposed in the optical beam to reduce visible stray light due to excessive IR and to avoid overloading the pixels of the PDA with IR radiation. A solenoid actuated shutter 15 is driven in accordance with computer 47 command to pass radiation wavelengths from the tungsten source, which would be a source of stray light if the ultraviolet (UV) wavelength range is in use. The deuterium ($D_2$) arc lamp 17 provides the ultraviolet wavelengths of the spectral range and is also the source providing the calibrating reference wavelength at 656.1 nanometers. When operating only in the UV, the tungsten source 11 is cut off by shutter 15, while when operating in the visible range both sources are open to the optical beam.

Radiation from the source lamps is redirected by flat mirror 19 and concentrated at apertures 23 and 25 by a concave mirror 20 after passing through a movable filter 14 on swing arm 24 actuated simultaneously with and like shutter 15, and a fixed filter 16 for attenuating reference response to unwanted grating orders. Filter 14 may be a LB120 made by Hoya or an equivalent light balancing "daylight" filter. When actuated it adjusts the radiant energy level emitted by the tungsten source so as not to overload the photodiode array in the visible and IR wavelengths. An optical shutter 26 for use in background determination and for blocking the optical beam 18 as required is located following aperture 25. Filter 16 is preferably located before aperture 23 and may be a UV22 made by Hoya or the equivalent. It is a sharp cut-off filter causing a sharp drop in UV below 200 nm.

The two apertures 23 and 25 are for controlling the beam cross-section when traversing the sample cuvette 27. Flat mirror 21 redirects the beam to concave mirror 22 which images the two apertures in the proper locations in the sample compartment 28 to effectively control the beam size as it passes through the cuvette without impingement on the cuvette walls or other loss in optical flux intensity. The cuvette may thus have an optical thickness from about 10 to about 100 nm, for example.

After passing through the cuvette the optical beam is imaged by concave mirror 29 at the entrance slit 33 of the monochromator 34, being directed thereto by flat mirror 31.

The monochromator of this preferred embodiment is shown as a Czerny-Turner type utilizing a plane diffraction grating as the dispersing device. While the Czerny-Turner monochromator is herein used for its simplicity and low aberration at the output image plane it is, of course, possible to use another type of monochromator while still practicing the novel scanning procedure of this invention. In the monochromator of FIG. 1, collimator mirror 35 parallelizes the beam from the slit 33 and directs it to a plane diffraction grating 39 mounted on a normally fixed mount (not shown). This mount has adjustment means used only for convenience in manufacture. A second mirror 43, similar to mirror 35, receives a first order dispersed beam from the grating and images it on the face of the PDA 45. Each photosensitive strip or pixel on the PDA acts as an individual exit slit and responds to a narrow wavelength band of the dispersed spectrum.

FIG. 1 shows the optical beam impinging on the grating 39. This grating in this embodiment has 100 lines or grooves per millimeter and its dispersion at the plane of the face of the PDA is such that the designed wavelength range, 200 to 850 nm, substantially covers the length of about 482 pixels of the array pattern. Since this is the only grating to be used, all components of the monochromator and the PDA can be mechanically fixed, except for the preliminary production grating adjustment. The resolution of the system is also fixed at about 1.5 nm by the pixel width, a resolution which is deemed to be adequate for most analyses.

The remaining 30 pixels beyond the cited wavelength range provide margin for possible secular displacement of the radiant spectrum, which will be automatically corrected for during initialization, a function which will be discussed later.

A complete discussion of all operational details of the preferred embodiment of this invention would include many associated computer routines and much discussion of the PDA which can already be found in detail in U.S. patent application, Ser. No. 704,356, previously referred to in the present application. For the sake of brevity it is deemed unnecessary to discuss herein such items except where it is required to clarify the essence or scope of this invention. It will be apparent to one skilled in the art that the basic operation of this preferred embodiment is similar to that of the reference when the reference is operated in what is referred to therein as the 'Survey' mode.

To cover a range from 200 to 850 nm requires radiation from two sources since no single practical low wattage source can cover this wide a range effectively. The commonly used deuterium arc or $D_2$ lamp produces adequate continuous radiation in the wavelength region from 200 to 400 nm, while a small tungsten halide (W) lamp does the same from about 390 to above 900 nm; both are suitable for use with the PDA as detector. However, if both lamps are used together during a scan from 200 to 850 nm the high intensity of the W lamp through the visible and near IR would result in high general stray light errors at the UV end caused by optical scatter of visible and near IR radiation to the UV pixels of the array. This stray light error cannot be entirely eliminated by any practical correction filter. It is impractical, for example, to try to mask the UV end of the PDA with a rejection filter for the visible and IR wavelengths due to the minute size of the array and due to probable interference effects. It is also impractical to try to switch the W lamp off or on during the scan because of timing and shut-off errors especially at the region of change-over.

The essence of the herein described invention is to eliminate the above-described stray light errors in the UV by combining sequential scans, one without the tungsten source radiation where only the UV part of the scan is to be used, and the other with the tungsten source radiation present where the UV part of the scan is not used. The switching and other operations effecting the above procedure are automatically directed by command from the computer 47. In addition the computer 47 also directs other associated routines which effect additional corrections for other errors to which the optical system is liable.

Exemplary sequences of the computer controller operation may be set forth as follows:

1. Initialization: When the system undergoes the final manufacturing checks and adjustments the wavelength scale is precalibrated by mechanically setting the grating position to cause the 656.1 nm emission line of the lighted $D_2$ lamp to fall on pixel No. 328 of the PDA within two or three pixels. During this adjustment shutter 15 and filter 14 remain in their "deactivated" condition. In other words shutter 15 is closed to exclude radiation from the W lamp and filter 14 is removed from the optical beam by the concomitent action of arm 24. To ascertain grating position shutter 26 opens, the PDA is scanned, and shutter 26 then closes. From the scan data the computer determines and displays the location of the peak of the 656.1 line relative to pixel number. Details of the computer routine effecting this determination are set forth in the reference application cited above. By successive mechanical adjustment the position of the $D_2$ peak is brought to the proper pixel. The grating thereafter remains fixed in this position, ie. it is not mechanically moved during normal use.

Each time the instrument is turned on in use the initialization procedure automatically repeats the $D_2$ check above. The computer 47 then determines and stores the difference between the correct and the determined peak location and uses this difference as a correction to be applied to the wavelength scale before display. This automatic wavelength correction will also be redetermined when called for throughout the use of the instrument.

The automatic calibration check is made possible because the UV scan plainly shows the $D_2$ line, thus outputting the necessary data. The VIZ/IR scan suppresses the $D_2$ line and the error it would cause. This is a feature of the invention.

2. Background Correction: The computer 47 leaves shutter 15 and filter 14 in the deactivated condition. Shutter 26 remains closed. The PDA is scanned and the data resulting is stored in a background buffer. This data constitutes a background (dark, or zero) correction.

3. Reference Scan Sequence: A blank or no sample is placed in the sample chamber. Components 14 and 15 are deactivated. Shutter 26 opens, a stabilizing delay of typically about 100 msec ensues, the PDA is scanned, 26 closes. The UV scan data thus obtained is stored in a buffer (A). Then 14 and 15 are activated, ie. shutter 15 opens and filter 14 is inserted into the beam. The shutter 26 sequence is repeated and the VIZ/IR scan data thus obtained is stored in a second buffer (B).

The computer 47 now combines the UV range in the contents of buffer A with the VIZ/IR range only in buffer B and subtracts from the combination the background error from the background buffer. This result is placed in the reference buffer.

4. Sample Scan Sequence: With a test sample in the sample chamber the sequence of section 3 above is repeated to secure the sample data. This is then combined with the data from the reference buffer and converted to % T or Absorbance in a manner known to the art. Wavelength corrections are made from a stored table, as described in the cited reference application, and the final results are displayed.

The computer controlled scan sequences above disclosed serve to clarify and make explicit the basic procedure of the invention. In addition several other features are made possible by and coact with the invention. These are set forth hereinafter:

A. Both sources remain lit at all times. This avoids source drift and instability, slow on or off response, and shortening of source life associated with switching source power on and off. The presence of radiation from the unshuttered $D_2$ lamp when making the VIZ-/IR scan is minimized by the attenuation of the leveling filter 14 and the lowered response to UV from the $D_2$ lamp of the PDA in comparison to its higher response to IR.

B. Placing filter 16 following the $D_2$ lamp is effective in increasing the sharpness of cutoff of the UV energy curve below 200 nm thus minimizing second order appearance in the reference scan between 360 and 400 nm which would otherwise show up as a stray light distortion of that part of the UV range. The filter has no effect on the rest of the wavelength range.

C. When the computer 47 combines the effective data from the sequential successive scans the software routine in the preferred embodiment is programmed to smooth the data for a short range, eg. $\pm 4$ pixels, on either side of the transition point. This eliminates any offset or spike at the transition point.

D. The computer 47, in handling the data from the successive scans, also can at this time apply the corrections required to fit the data to the wavelength curve of this monochromator using the PDA as an extended plane receiver. Details of this may be found in the reference application previously cited under the heading "Survey Mode Calculation".

Although a certain particular embodiment of the invention has been herein disclosed for purposes of explanation, various modifications thereof, after study of the specification, will be apparent to those skilled in the art to which the invention pertains, and reference should accordingly be had to the appended claims in determining the scope of the invention.

What is claimed is:

1. A spectrophotometer system comprising, in combination:
   a photodiode array acting as an output detector for said spectrophotometer;
   two or more light sources each delivering a useful range of radiant wavelengths to the optical beam of said spectrophotometer, said useful ranges covering in combination the whole of the total spectrophotometric range of the spectrophotometer;
   a plurality of shutter means located to interact with said optical beam, and being capable when closed of intercepting all the radiant energy in said beam from one or more of said sources;
   fixed and movable filter means locate in said optical beam for providing radiant energy level adjustment to prevent photodiode array response overload over selected wavelength ranges;

a monochromator comprising dispersion means for forming a radiant energy spectrum extended along the whole receiving photosensitive region of said photodiode array in a fixed predetermined spatial relationship thereto;

computer means including command means for actuating said shutter means and said movable filter means; and said computer means including means for computational initiation, processing and display of scan generated data correlated with associated spectrum wavelength values.

2. The apparatus of claim 1 wherein said light sources comprise a tungsten halide lamp and a deuterium arc lamp.

3. The apparatus of claim 1 wherein one of said shutter means when actuated intercepts all radiant energy in said optical beam originating only in said tungsten halide lamp.

4. The apparatus of claim 1 wherein said movable filter means when actuated intercepts said optical beam at a location following the deuterium source.

5. The apparatus of claim 3 wherein both said movable shutter and filter means are normally actuated simultaneously by said computer controlled command means.

6. The apparatus of claim 4 wherein both said movable shutter and filter means are normally actuated simultaneously by said computer controlled command means.

7. The apparatus of claim 5 wherein said computer means normally initiates a photodiode array scan with said movable shutter and filter means deactivated and immediately thereafter initiates another photodiode array scan with said shutter and filter means activated; preselected data resulting from said scans being stored in separate memories for subsequent processing.

8. The apparatus of claim 6 wherein said computer means normally initiates a photodiode array scan with said movable shutter and filter means deactivated and immediately thereafter initiates another photodiode array scan with said shutter and filter means activated; preselected data resulting from said scans being stored in separate memories for subsequent processing.

9. The apparatus of claim 7 wherein said computer means inverts the order of said scans.

10. The apparatus of claim 8 wherein said computer means inverts the order of said scans.

11. The apparatus of claim 9 wherein said preselected data is combined by said computer means to constitute a complete scan covering the full desired wavelength range.

12. The apparatus of claim 10 wherein said preselected data is combined by said computer means to constitute a complete scan covering the full desired wavelength range.

13. The apparatus of claim 11 wherein the wavelength region adjacent the transition point between said combined scans is smoothed by said computer means to eliminate spikes, offsets and other preselected artifacts.

14. The apparatus of claim 12 wherein the wavelength region adjacent the transition point between said combined scans is smoothed by said computer means to eliminate spikes, offsets and other preselected artifacts.

15. A spectrophotometer system comprising a photodiode array configured as an output detector for a spectrophotometer, a first visible-infrared light source and a second ultraviolet light source for generating an optical beam, each said source delivering a useful range of radiant wavelengths to the optical beam incident the entrance slit of a monochromator, the useful ranges of said light sources covering in combination the whole of the total spectrophotometric wavelength range of the spectrophotometer, first shutter means for intercepting radiation from said first light source, second shutter means for intercepting all of said optical beam, fixed filter means for providing radiant energy level adjustment to prevent photodiode array response overload over selected wavelength ranges and to effect second order stray light rejection, movable filter means positionable in said optical beam for controlling radiant energy level from said visible-infrared light source, a monochromator having dispersion means for forming a radiant energy spectrum extended substantially along the whole receiving photosensitive region of said photodiode array in a fixed predetermined longitudinal wavelength relationship thereto, and computer control means for successively scanning the entire photodiode array wavelength range for each said light source and combining serially by wavelength only the useful range of wavelengths for each respective light source to obtain a single complete scan covering the whole wavelength range, said computer control means having means for controlling said first and second shutter means and said moveable filter means.

16. The apparatus of claim 15 wherein said monochromator has a fixed diffraction grating.

17. The apparatus of claim 16 wherein all components of the monochromator and photodiode array are mechanically fixed.

18. The apparatus of claim 15 wherein said first light source comprises a tungsten halide lamp and said second light source comprises a deuterium arc lamp.

19. The apparatus of claim 15 wherein said first shutter means when activated passes radiant energy in said optical beam originating in said first light source and wherein said moveable filter means when activated intercepts said optical beam at a location following said second light source.

20. The apparatus of claim 15 wherein the said second shutter means when deactivated interrupts all radiant energy in said optical beam originating in said light sources.

21. The apparatus of claim 15 wherein both said first shutter means and said moveable filter means are normally either activated or deactivated simultaneously by said computer control means.

22. The apparatus of claim 21 wherein said second shutter means may be activated or deactivated by said computer control means independently of the state of activation of said first shutter means and of said moveable filter means.

23. A spectrophotometer system comprising a photodiode array configured as an output detector for a spectrophotometer, a monochromator having an entrance slit and a fixed diffraction grating aligned for forming a radiant energy spectrum extended substantially along the whole receiving photosensitive region of said photodiode array in a fixed predetermined longitudinal relationship thereto, light source means for generating an optical beam along a predetermined optical path to said entrance slit of said monochromator, said light source means having a first visible-infrared light source and a second ultraviolet light source with said second light source being disposed on said optical path between said first light source and said entrance slit, each said light source delivering a useful wavelength range of radiation to the optical beam with the ranges in combination covering the overall wavelength range of the spectrophotometer, sample cuvetter means disposed on said optical path between said second light source and said monochromator, first shutter means for intercepting radiation from said first light source, said first shutter means being disposed between said first and second light sources, second shutter means for intercepting said optical beam and being disposed on said optical path between said second light source and said sample cuvette means, movable filter means for adjusting radiant energy level from said first source so as not to overload the photodiode array in the visible and infrared wavelengths, said filer means being disposed for selective insertion in said optical beam between said second light source and said monochromator, fixed filter means interposed in said optical beam for providing radiant energy level adjustment to prevent photodiode array response overload over selected wavelength ranges and to effect second order stray light rejection, and computer control means for successively scanning the entire photodiode array wavelength range for each said light source and combining serially by wavelength only the useful range of wavelengths for each respective light source to obtain a single complete scan covering the whole wavelength range, said computer control means having means for controlling said first and second shutter means and said moveable filter means.

24. The apparatus of claim 23 wherein said fixed filter means comprises a first heat infrared absorbing filter means disposed in said optical beam between said first and second light sources to reduce visible stray light due to excessive infrared radiation and to avoid overloading said photodiode array with infrared radiation, and a second filter means disposed between said second light source and said sample cuvetter means for minimizing second order appearance in a predetermined wavelength range.

25. The apparatus of claim 23 wherein said first light source is a small tungsten halide lamp delivering a useful wavelength range of approximately 400 to 850 nm and said second light source is a deuterium arc lamp delivering a useful wavelength range of approximately 200 to 400 nm for an overall spectrophotometer range of 200 to 850 nm.

26. A method of generating a single analytical spectral response over a predetermined wide wavelength range in a spectrophotometer having a photodiode array output detector and first and second light sources forming the optical beam with the first light source having a first effective wavelength range such that the first and second effective wavelength ranges in combination cover said predetermined wavelength range, comprising the steps of:

maintaining the first and second-light sources in an on state for forming the optical beam, shuttering off the first light source from the optical beam and thereafter scanning the photodiode array over said predetermined wavelength range to generate spectral response data including a first set of spectral response data corresponding to said first effective wavelength range, opening the first light source to the optical beam, adjusting the level of radiant energy emitted by the first light source to prevent overload of the photodiode array and thereafter scanning the photodiode array over said predetermined wavelength range to generate spectral response data including a second set of spectral response data corresponding to said second effective wavelength range, and processing the spectral response data to combine said first and second sets of data to form a single spectrum response over said predetermined wavelength range.

27. The method of claim 26 which comprises shuttering off the optical beam and thereafter scanning the photodiode array over the predetermined wavelength range to generate background correction data, said processing step including adjusting the spectral response data in accordance with said background correction data.

28. The method of claim 26 wherein the steps of shuttering off the first light source and scanning the photodiode array, opening the first light source, and adjusting the radiant energy level and scanning the photodiode array are first performed as a reference spectral response data over said predetermined wavelength and thereafter said steps are repeated with a sample as a sample scan sequence, said processing step including adjusting the spectral response data in accordance with said reference spectral response data.

29. The method of claim 28 which comprises shuttering off the optical beam and thereafter scanning the photodiode array over the predetermined wavelength range to generate background correction data prior to said reference scan sequence and said sample scan sequence, said processing step including adjusting the spectral response data in accordance with said background correction data.

30. The method of claim 26 wherein the first light source is a visible infrared tungsten lamp with an effective wavelength range of approximately 400 to 850 nm and the second light source is a deuterium arc lamp with an effective wavelength range of 200–400 nm and the predetermined wavelength range of the spectrophotometer is 200–850 nm, comprising processing the spectral response data to combine said first set of spectral response data corresponding to the effective wavelength range of 400–850 nm. for said tungsten lamp and said second set of spectral response data corresponding to the effective wavelength of 200–400 nm. for said deuterium arc lamp to form a single spectrum response over a range of 200–850 nm.

31. The method of claim 30 which comprises filtering the optical beam for a sharp cut-off below 200 nm for minimizing second order appearance.

32. The method of claim 26 comprising filtering the optical beam to minimize second order appearance over said second effective wavelength range.

33. The method of claim 26 wherein the step of processing the spectral response data comprises smoothing the transition region on said single spectrum response between said first and second effective wavelength ranges to eliminate spikes, offset and other preselected artifacts.

34. The method of claim 33 wherein said single spectrum response is shifted by a wavelength calibration correction.

* * * * *